United States Patent [19]

Yamagishi

[11] 3,989,555

[45] Nov. 2, 1976

[54] NICKEL-IRON MATERIAL HAVING HIGH MAGNETIC PERMEABILITY

[75] Inventor: Tomoo Yamagishi, Hamamatsu, Japan

[73] Assignee: Nippon Gakki Seizo Kabushiki Kaisha, Japan

[22] Filed: June 20, 1975

[21] Appl. No.: 588,891

Related U.S. Application Data

[63] Continuation-in-part of Ser. No. 433,536, Jan. 15, 1974, abandoned.

[30] Foreign Application Priority Data

Apr. 11, 1973 Japan .............................. 48-40361

[52] U.S. Cl. .............................. 148/31.55; 75/170; 75/171; 148/31.57; 148/120; 148/121

[51] Int. Cl.² ........................................ C04B 35/00

[58] Field of Search ............ 148/31.55, 31.57, 120, 148/121; 75/170, 171

[56] References Cited

UNITED STATES PATENTS

| | | | |
|---|---|---|---|
| 1,768,237 | 6/1930 | Elmen | 75/170 |
| 1,910,309 | 5/1933 | Smith et al. | 75/170 |
| 2,002,689 | 5/1935 | Bozorth et al. | 148/31.55 |
| 3,021,211 | 2/1962 | Flinn | 75/170 |
| 3,794,530 | 2/1974 | Masumoto et al. | 148/31.55 |

FOREIGN PATENTS OR APPLICATIONS

| | | | |
|---|---|---|---|
| 278,454 | 10/1927 | United Kingdom | 75/171 |

*Primary Examiner*—Walter R. Satterfield
*Attorney, Agent, or Firm*—Cushman, Darby & Cushman

[57] ABSTRACT

A material having a high magnetic permeability made by a base composition consisting essentially of, by weight, 75–82 percent of nickel and 5–24 percent of iron, with or without 2–6 percent of molybdenum, 1 or less percent of manganese, 1 or less percent of silicon, and by an additive mixture consisting of at least two different types of elements, one of which types of elements being at least one element selected from the group of elements consisting of titanium, zirconium, vanadium, niobium, chromium and tungsten, and the other being aluminum, said additive being contained in said base composition in an amount that the total content of said at least two different types of elements falls within the range of 1–8 percent of the whole weight of said material. This material exhibits a high mechanical strength, and toughness, a high resistance to wear from friction and a high magnetic permeability.

5 Claims, 11 Drawing Figures

NICKEL-IRON MATERIAL HAVING HIGH MAGNETIC PERMEABILITY

CROSS-REFERENCE TO RELATED APPLICATIONS

This application is a continuation-in-part application of Ser. No. 433,536 filed Jan. 15, 1974 and now abandoned, which is relied upon and incorporated herein by reference.

An object of the present invention is to provide a material for magnetic head cores, made with a base composition consisting essentially of, by weight, 75–82 percent of nickel and 5–24 percent of iron, with or without 2–6 percent of molybdenum, 1 or less percent of manganese, 1 or less percent of silicon, and by an additive contained in said base composition and consisting of at least two different kinds of elements (a) and (b) of specific combination of (a) aluminum which is an essential component element, and at least one element (b) selected from titanium, zirconium, vanadium, niobium, chromium and tungsten in such a manner that the total amount of the additive is within 1–8 percent by weight of the total weight of the material.

Yet another object of the present invention is to provide a material of the type described above, which, in addition to the aforesaid properties, may be easily heat-treated during the manufacturing process of the alloy of this invention.

A further object of the present invention is to provide a material of the type described above, which resists oxidization during the manufacturing process of the alloy of this invention.

DETAILED DESCRIPTION OF THE PREFERRED EMBODIMENT

As a result of an extensive research conducted by the inventor, the present invention was based on the discovery that the resistance to wear caused by friction of 78-permalloy which has been used widely in certain fields of industry can be remarkably enhanced by the inclusion therein of several kinds of elements.

The material having a high magnetic permeability which is prepared according to the present invention consists of an essential base composition:

| | |
|---|---|
| nickel | 75–82% by weight |
| iron | 5–24% by weight |

and an additive mixture included in said base composition and consisting of at least two different types of elements, one of which types of elements being at least one element (b) selected from the group consisting of titanium, zirconium, vanadium, niobium, chromium and tungsten, and the other being (a) aluminum, said additive being contained in said base composition in an amount that the total content of said at least two different types of elements falls within the range of 1–8 percent of the whole weight of said material.

The reason why said additive consists of at least two different kinds of elements is based on the following finding. That is, it has been found that in case only (a) or (b) listed above is included as an additive in the base composition, the resulting material will have an enhanced mechanical strength but will exhibit a lower magnetic characteristic, almost irrespective of the number of the elements of which the additive consists. Then, a comparison was made of the characteristics of the material having the additive consisting of one element with the characteristic of the material including the additive consisting of two or more different elements, keeping the amount of the additives in both cases in the same level. It was found that the level of hardness obtained where the additive consisted of one element was much smaller than that of the hardness obtained where the additive consisted of two or more different elements, although their magnetic characteristics showed much the same value.

Also, the reason for the limitation of 1–8 percent by weight of (a) and (b), based on the final weight of the material is based on the finding that, in case the additive mixture is included in an amount less than 1 percent, the hardness characteristics of the alloy is unsatisfactory and that in case it is in excess of 8 percent, a marked loss of magnetic characteristics results and that accordingly the value $\mu_0$ of the initial relative permeability which is required of a material of magnetic head cores will drop to a level less than 10,000.

Although the base composition of the material according to the present invention consists essentially of, by weight, 75–82 percent of nickel and 5–24 percent of iron as hereinbefore stated, this base composition contains 1–8 percent by weight of the total weight of the resulting material of (a) aluminum and (b) at least one element of the following elements: niobium, titanium, chromium, vanadium, zirconium and tungsten. In addition, the alloy may contain 0–1 percent manganese, 0–1 percent silicon and 2–6 percent molybdenum. Unless specifically recited otherwise all percents are percent by weight of the final material. In addition to the essential element, aluminum, the additional components (b) may be used either singly or as a combination so long as the total amount of these two kinds of additive components is within 1–8 percent by weight of the total weight of the resulting material. Further, the inclusion of manganese and silicon is adopted when it is intended to prevent the oxidization of the alloy of the present invention, whereas the inclusion of, for example, molybdenum, niobium, chromium and tungsten is intended to facilitate the heat treatment during the process of manufacturing the alloy of the present invention and to improve the magnetic characteristic of this alloy.

Description in some examples of the present invention is presented in order that this invention may be understood more clearly.

The materials of the basic composition which are employed in the manufacture of the material of the following examples which have a high magnetic permeability according to the present invention are: electrolytic nickel having a purity of 99.5 percent or higher as the nickel component, powder briquet of molybdenum having a purity of 99.0 percent or higher as the molybdenum component, electrolytic manganese having a purity of 99.0 percent or higher as the manganese component, and metallic silicon having a purity of 99.0 percent or higher as the silicon component. Electrolytic iron having a purity of 99.5 percent or higher is used. As for the materials to serve as the additive elements, there are used spongy aluminum, spongy titanium, spongy zirconium, powder vanadium having a purity of 99.0 percent or higher, powder niobium having a purity of 99.0 percent or higher, tantalum having a purity of 99.0 percent or higher and powder briquet of tungsten having a purity of 99.0 percent or higher.

EXAMPLE

The following additive elements were added to batches of alloy having the composition of, by weight, 79.5% of Ni, 10.5% of Fe, 3.8% of Mo, 0.5% of Mn and 0.4% of Si.

| No. of test pieces | Proportion of elements added (by weight %) | | | |
|---|---|---|---|---|
| 1 | Nb 2.8%; | Ti 2.0%; | Al 2.0% | |
| 2 | Nb 3.0%; | Ti 1.5%; | Al 1.0% | |
| 3 | Nb 3.0%; | Ti 0.5%; | Al 2.0% | |
| 4 | Nb 3.5%; | Al 2.5% | | |
| 5 | V 3.0%; | Ti 2.0%; | Al 1.0% | |
| 6 | V 3.0%; | Ti 0.5%; | Al 2.5% | |
| 7 | V 3.0; | Al 2.5% | | |
| 8 | Cr 3.0%; | Ti 1.5%; | Al 1.5% | |
| 9 | Nb 3.0%; | Zr 1.0%; | Al 1.5% | |
| 10 | Nb 2.8%; | Ti 1.0%; | Zr 0.5%; | Al 1.0% |
| 11 | Ta 1.5%; | Nb 1.5%; | Ti 1.5%; | Al 1.0% |
| 12 | W 1.0%; | Nb 2.0%; | Ti 2.0%; | Al 0.5% |

From the resulting respective mixtures, the test pieces were prepared in the following manner.

Each mixture was melted in a vacuum condition of $10^{-2}$ more or less in a high frequency vacuum induction furnace and the melted material was casted into a block of 40 mm × 100 mm × 150 mm in size by the use of a die made of cast iron. Then, this block was given a hot rolling at 1100° C to reduce the initial thickness of 40 mm to about 10 mm. The resulting block was subjected to a cold rolling to reduce the thickness to 1.5 mm. This thinned block was then annealed for 2 hours at 800° C in an annealing furnace. The annealed piece was further subjected to a cold rolling to produce a thin plate of 0.35 mm in thickness. From this thin plate was punched a ring-shaped test piece having an outer diameter of 30 mm and an inner diameter of 22 mm. This ring-shaped test piece was annealed for 2 hours at 1100° C in a high purity hydrogen atmosphere whose dew point was −60° C or lower and then it was cooled in the furnace until the temperature dropped to 700° C. Thereafter, the test pieces thus obtained were cooled further to 300° C by varying the speed of cooling.

The property of each of these test pieces was determined and the result is shown in the following Table 1.

Table 1

| Numbers of test pieces of this invention | Hardness (Hv) | Initial relative permeability ($\mu_o$) | Maximum relative permeability ($\mu_m$) | Coercive force (Hc) [A/m] |
|---|---|---|---|---|
| | 244 | 86,000 | 164,000 | 1.04 |
| 2 | 268 | 64,000 | 149,000 | 1.44 |
| 3 | 264 | 21,000 | 63,000 | 1.92 |
| 4 | 246 | 12,000 | 66,000 | 2.56 |
| 5 | 225 | 49,000 | 110,000 | 1.52 |
| 6 | 243 | 27,000 | 74,000 | 2.08 |
| 7 | 237 | 18,000 | 60,000 | 2.12 |
| 8 | 209 | 30,000 | 88,000 | 1.76 |
| 9 | 208 | 58,000 | 115,000 | 1.44 |
| 10 | 221 | 53,000 | 134,000 | 1.68 |
| 11 | 223 | 52,000 | 114,000 | 1.60 |
| 12 | 230 | 43,000 | 106,000 | 1.52 |

Notes:
In the values of measurements, $\mu_o$ was calculated by a self-recording fluxmeter from the measured density of magnetic flux at the magnetic field of 0.4 A/m. The values of Hc were sought by first magnetizing the test pieces at 80 A/m and thereafter by inverting their magnetic pole.

Especially desirable results were obtained from the employment of an additive consisting of the following combinations of components in the following ranges of amounts:

| | | | |
|---|---|---|---|
| a) | Nb | 2–6% | (by weight) |
| | Ti | 1–3% | " |
| | Al | 0.1–2% | " |
| b) | Nb | 2–6% | " |
| | Al | 0.1–2% | " |
| c) | V | 2–6 | " |
| | Ti | 1–3 | " |
| | Al | 0.1–2 | " |
| d) | V | 2–6 | " |
| | Al | 0.1–2 | " |
| e) | W | 3–7 | " |
| | Ti | 1–4 | " |
| | Al | 0.1–2 | " |

The following compositions of the inventions in Tables I–XI are alloys comprising a base alloy of 75 – 82 percent Ni and 5 – 24 percent Fe and include and 1 to 8 percent of an additive mixture consisting of (a) aluminum and (b) titanium, zirconium, vanadium, niobium, chromium, tungsten and mixtures thereof. These compositions are characterized by an initial permeability ($\mu_o$) of at least 10,000; a hardness (Hv) of at least 180 and a coercive force (Hc) of up to, i.e., not greater than, 3.18 A/m. Compositions in the Tables followed by one asterisk (*) are outside the scope of the invention while 2 asterisks (**) indicate that a particular characteristic ($\mu_o$, $\mu_m$, Hc of Hv) was not determined for that composition. These compositions were prepared in accordance with the procedures in the example.

Table I

ALLOYS OF THE INVENTION

| | Alloy No. | Contents Ni | Fe | Al | Nb | $\mu_o$ | $\mu_m$ | Hc A/m | Hv |
|---|---|---|---|---|---|---|---|---|---|
| Al+Nb | 1-1 | 81.7 | 17.3 | 0.5 | 0.5 | 64,000 | 143,000 | 1.19 | 182 |
| | -2 | 81.4 | 16.1 | 1.5 | 1.0 | 60,000 | 133,000 | 1.35 | 190 |
| | -3 | 77.6 | 17.4 | 2.0 | 3.0 | 41,000 | 108,000 | 1.51 | 192 |
| | -4 | 80.2 | 13.8 | 3.5 | 2.5 | 23,000 | 83,000 | 2.23 | 230 |
| | -5 | 81.7 | 11.3 | 5.0 | 2.0 | 11,000 | 64,000 | 2.31 | 220 |
| | -6 | 78.2 | 13.8 | 6.5 | 1.5 | 11,000 | 60,000 | 2.39 | 241 |
| | -7* | 81.1 | 10.4 | 7.0 | 1.5 | 8,000 | 52,000 | 2.95 | 280 |

The alloys of this Table and the effect of change of the ratio of components are presented in FIG. 1.

Table II

| | | Ni | Fe | Al | Nb | Ti | $\mu_o$ | $\mu_m$ | Hc A/m | Hv |
|---|---|---|---|---|---|---|---|---|---|---|
| Al+Nb+Ti | 2-1 | 81.3 | 17.7 | 0.5 | 0.2 | 0.3 | 60,000 | 186,000 | 0.96 | 180 |
| | -2 | 81.3 | 16.2 | 1.0 | 0.5 | 1.0 | 48,000 | 148,000 | 1.11 | 192 |
| | -3 | 77.1 | 18.4 | 0.5 | 2.0 | 2.0 | 36,000 | 164,000 | 1.03 | 244 |
| | -4 | 78.8 | 15.7 | 1.0 | 3.0 | 1.5 | 36,000 | 144,000 | 1.32 | 266 |
| | -5 | 78.9 | 15.6 | 3.0 | 3.0 | 0.5 | 21,000 | 83,000 | 1.91 | 268 |
| | -6* | 75.5 | 16.0 | 4.0 | 2.0 | 2.5 | 9,000 | 46,000 | 3.18 | 276 |

The alloys of this Table and the effect of change of the ratio of components are presented in FIG. 2.

Table III

| | | Ni | Fe | Al | Cr | $\mu_o$ | $\mu_m$ | Hc A/m | Hv |
|---|---|---|---|---|---|---|---|---|---|
| Al+Cr | 3-1 | 81.2 | 18.1 | 0.5 | 0.2 | 46,000 | 163,000 | ** | 181 |
| | -2 | 82.0 | 15.0 | 1.0 | 2.0 | 38,000 | 140,000 | 1.35 | 192 |
| | -3 | 77.1 | 18.4 | 3.0 | 1.5 | 31,000 | 136,000 | 1.43 | 206 |
| | -4 | 77.3 | 17.2 | 4.0 | 1.5 | 18,000 | 111,000 | 1.51 | 222 |
| | -5* | 79.2 | 12.3 | 5.0 | 3.5 | 9,000 | 88,000 | 2.07 | 261 |

*Compositions followed by asterisks are outside the scope of the invention.
**Not calculated
The alloys of this Table and the effect of change of the ratio of components are presented in FIG. 3.

Table IV

| | | Ni | Fe | Al | Cr | Nb | $\mu_o$ | $\mu_m$ | Hc A/m | Hv |
|---|---|---|---|---|---|---|---|---|---|---|
| Al+Cr+Nb | 4-1 | 79.9 | 19.1 | 0.2 | 0.6 | 0.2 | 34,000 | 130,000 | 1.11 | 186 |
| | -2 | 79.1 | 16.9 | 1.0 | 1.0 | 2.0 | 28,000 | 110,000 | 1.27 | 198 |
| | -3 | 75.0 | 17.5 | 4.5 | 1.0 | 2.0 | 14,000 | 86,000 | 1.59 | 240 |
| | -4 | 79.4 | 12.1 | 2.5 | 3.5 | 2.5 | 12,000 | 75,000 | ** | 286 |

**Not Calculated
The alloys of the Table and the effect of change of the ratio of components are presented in FIG. 4.

Table V

| | | Ni | Fe | Al | V | $\mu_o$ | $\mu_m$ | Hc A/m | Hv |
|---|---|---|---|---|---|---|---|---|---|
| Al+V | 5-1 | 77.3 | 20.7 | 1.0 | 1.0 | 50,000 | 162,000 | 0.06 | 183 |
| | -2 | 77.1 | 18.4 | 2.5 | 2.0 | 44,000 | 136,000 | 1.35 | 193 |
| | -3 | 79.0 | 15.5 | 2.5 | 3.0 | 32,000 | 80,000 | 1.59 | 220 |
| | -4 | 76.4 | 15.6 | 6.0 | 2.0 | 14,000 | 60,000 | 1.99 | 246 |
| | -5* | 77.7 | 13.8 | 8.0 | 0.5 | 8,000 | 76,000 | 2.79 | 262 |

The alloys of this Table and the effect of change of the ratio of components are presented in FIG. 5.

Table VI

| | | Ni | Fe | Al | V | Ti | $\mu_o$ | $\mu_m$ | Hc A/m | Hv |
|---|---|---|---|---|---|---|---|---|---|---|
| Al+V+Ti | 6-1 | 77.0 | 21.5 | 0.5 | 0.5 | 0.5 | 62,000 | 120,000 | 1.11 | 188 |
| | -2 | 75.6 | 18.4 | 1.0 | 3.0 | 2.0 | 56,000 | 108,000 | 1.27 | 192 |
| | -3 | 80.4 | 13.6 | 2.5 | 3.0 | 0.5 | 39,000 | 100,000 | 2.23 | 225 |
| | -4 | 79.7 | 13.3 | 2.5 | 2.0 | 2.5 | 28,000 | 88,000 | 2.07 | 239 |
| | -5 | 80.8 | 12.2 | 3.0 | 1.0 | 3.0 | 13,000 | 82,000 | 2.39 | 255 |
| | -6* | 80.4 | 11.1 | 2.0 | 4.0 | 2.5 | 9,000 | 74,000 | 2.87 | 268 |

*Compositions followed by asterisks are outside the scope of the invention.
The alloys of this Table and the effect of change of the ratio of components are presented in FIG. 6.

Table VII

| | | Ni | Fe | Al | $\overline{w}$ | $\mu_o$ | $\mu_m$ | Hc A/m | Hv |
|---|---|---|---|---|---|---|---|---|---|
| Al+$\overline{w}$ | 7-1 | 81.9 | 17.1 | 0.5 | 0.5 | 45,000 | 145,000 | 1.27 | 180 |
| | -2 | 80.8 | 16.2 | 2.0 | 1.0 | 30,000 | 130,000 | 1.51 | 186 |
| | -3 | 81.1 | 12.4 | 4.0 | 2.5 | 18,000 | 96,000 | 1.67 | 206 |
| | -4 | 79.9 | 12.1 | 6.0 | 2.0 | 12,000 | 88,000 | 1.75 | 242 |
| | -5* | 76.9 | 14.6 | 8.0 | 0.5 | 8,000 | 78,000 | 2.07 | 273 |

The alloys of this Table and the effect of change of the ratio of components are presented in FIG. 7.

Table VIII

| | | Ni | Fe | Al | $\overline{w}$ | Ti | $\mu_o$ | $\mu_m$ | Hc A/m | Hv |
|---|---|---|---|---|---|---|---|---|---|---|
| Al+$\overline{w}$+Ti | 8-1 | 80.0 | 19.0 | 0.5 | 0.2 | 0.3 | 40,000 | 120,000 | 1.35 | 186 |
| | -2 | 78.4 | 17.1 | 1.0 | 1.5 | 2.0 | 38,000 | 99,000 | 1.91 | 190 |

Table VIII-continued

| | Ni | Fe | Al | W | Ti | $\mu_o$ | $\mu_m$ | Hc A/m | Hv |
|---|---|---|---|---|---|---|---|---|---|
| -3 | 78.6 | 14.4 | 3.0 | 2.0 | 2.0 | 24,000 | 86,000 | 1.91 | 246 |
| -4 | 78.8 | 13.7 | 4.0 | 3.0 | 0.5 | 14,000 | 77,000 | 2.07 | 253 |
| -5* | 79.8 | 11.7 | 5.0 | 2.0 | 1.5 | 8,000 | 61,000 | 2.39 | 272 |

The alloys of this Table and the effect of change of the ratio of components are presented in FIG. 8.

Table IX

| | | Ni | Fe | Al | Cr | Ti | $\mu_o$ | $\mu_m$ | Hc A/m | Hv |
|---|---|---|---|---|---|---|---|---|---|---|
| Al+Cr+Ti | 9-1 | 81.4 | 17.6 | 0.5 | 0.3 | 0.2 | 36,000 | 108,000 | 1.03 | 184 |
| | -2 | 81.8 | 16.2 | 1.0 | 0.5 | 0.5 | 24,000 | 99,000 | 1.35 | 193 |
| | -3 | 80.7 | 13.8 | 3.0 | 2.0 | 0.5 | 18,000 | 78,000 | 0.030 | 240 |
| | -4 | 78.1 | 14.9 | 4.0 | 1.0 | 2.0 | 13,000 | 68,000 | 3.18 | 243 |
| | -5* | 75.6 | 15.9 | 5.0 | 3.0 | 0.5 | 9,000 | 56,000 | 3.18 | 266 |

The alloys of this Table and the effect of change of the ratio of components are presented in FIG. 9.

Table X

| | | Ni | Fe | Al | Zr | $\mu_o$ | $\mu_m$ | Hc A/m | Hv |
|---|---|---|---|---|---|---|---|---|---|
| Al+Zr | 10-1* | 78.5 | 20.7 | 0.5 | 0.3 | 45,000 | 124,000 | 1.27 | 178 |
| | -2 | 81.0 | 17.0 | 1.0 | 1.0 | 40,000 | 110,000 | 1.51 | 185 |
| | -3 | 78.7 | 14.8 | 2.5 | 4.0 | 17,000 | 64,000 | 2.23 | 230 |
| | -4* | 78.5 | 13.0 | 4.0 | 4.5 | 9,000 | 36,000 | 3.50 | 265 |
| | -5 | 79.4 | 12.6 | 4.0 | 4.0 | 10,000 | 39,000 | 3.34 | 262 |

*Compositions followed by asterisk are outside the scope of the invention.
The alloys of this Table and the effect of change of the ratio of components are presented in FIG. 10.

Table XI

| | | Ni | Fe | Al | Zr | Nb | $\mu_o$ | $\mu_m$ | Hc A/m | Hv |
|---|---|---|---|---|---|---|---|---|---|---|
| Al+Zr+Nb | 11-1 | 81.6 | 17.4 | 0.5 | 0.2 | 0.2 | 39,000 | 137,000 | 1.19 | 178 |
| | -2 | 81.2 | 17.8 | 0.5 | 0.2 | 0.3 | 39,000 | 138,000 | 1.27 | 180 |
| | -3 | 80.3 | 16.2 | 1.0 | 0.5 | 2.0 | 32,000 | 96,000 | 1.59 | 210 |
| | -4 | 77.5 | 15.5 | 3.0 | 3.5 | 0.5 | 16,000 | 80,000 | 2.39 | 243 |
| | -5* | 78.1 | 13.4 | 4.0 | 3.0 | 1.5 | 7,000 | 39,000 | 2.39 | 256 |
| | -6 | 79.3 | 12.7 | 3.5 | 3.5 | 1.0 | 10,000 | 43,000 | 2.39 | 248 |

The alloys of this Table and the effect of change of the ratio of components are presented in FIG. 11.

In the Tables I–XI a base alloy of Fe and Ni is modified with an additive mixture consisting of (a) aluminum and (b) Ti, Zr, V, Nb, Cr, W, or mixtures of (1) Nb and Ti, (2) Cr and Nb (3) V and Ti, (4) W and Ti (5) Cr and Ti and (6) Zr and Nb. Tables I–XI and composition therein correspond to the results graphed in FIGS. 1 through 11, respectively.

Figure 1:
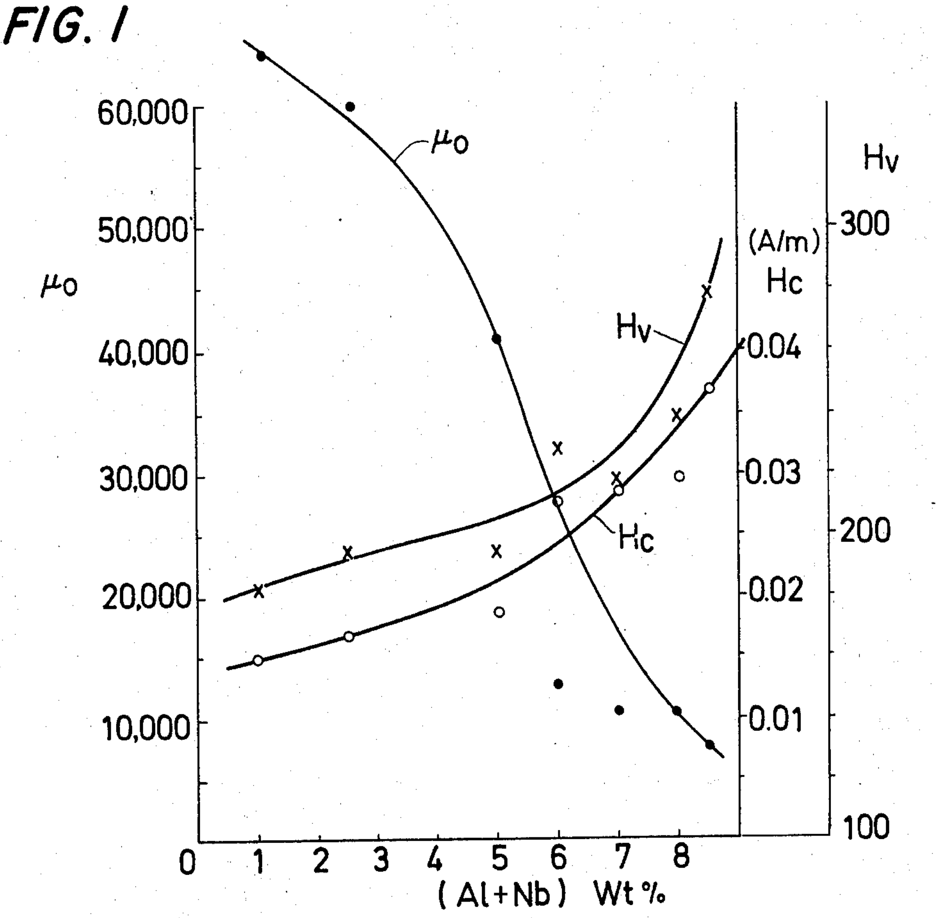
FIG. 1 represents alloys wherein the elements (a) Al and (b) Nb are incorporated into the base Ni-Fe composition and the effect on characteristics of the resulting alloy by varying amounts of (a) and (b).
Figure 2:
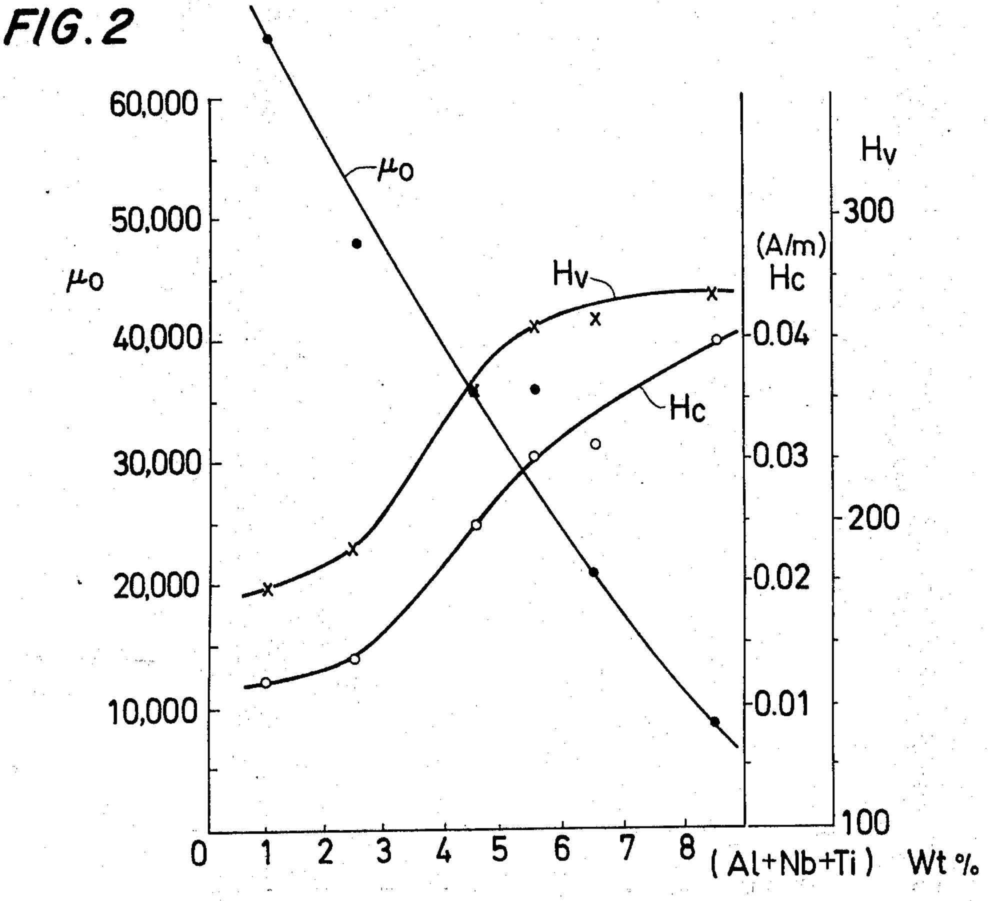
FIG. 2 represents alloys wherein the elements (a) Al and (b) Nb and Ti are incorporated into the base Ni-Fe composition and the effect on characteristics of the resulting alloy by varying amounts of (a) and (b).
Figure 3:
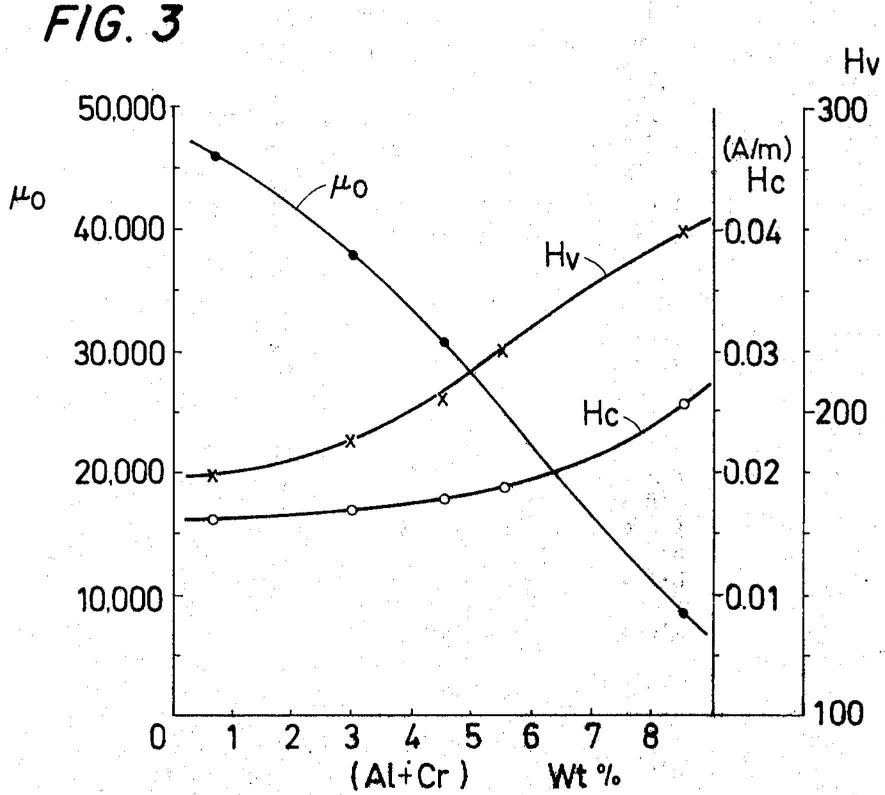
FIG. 3 represents alloys wherein the elements (a) Al and (b) Cr are incorporated into the base Ni-Fe composition and the effect on characteristics of the resulting alloy by varying amounts of (a) and (b).
Figure 4:
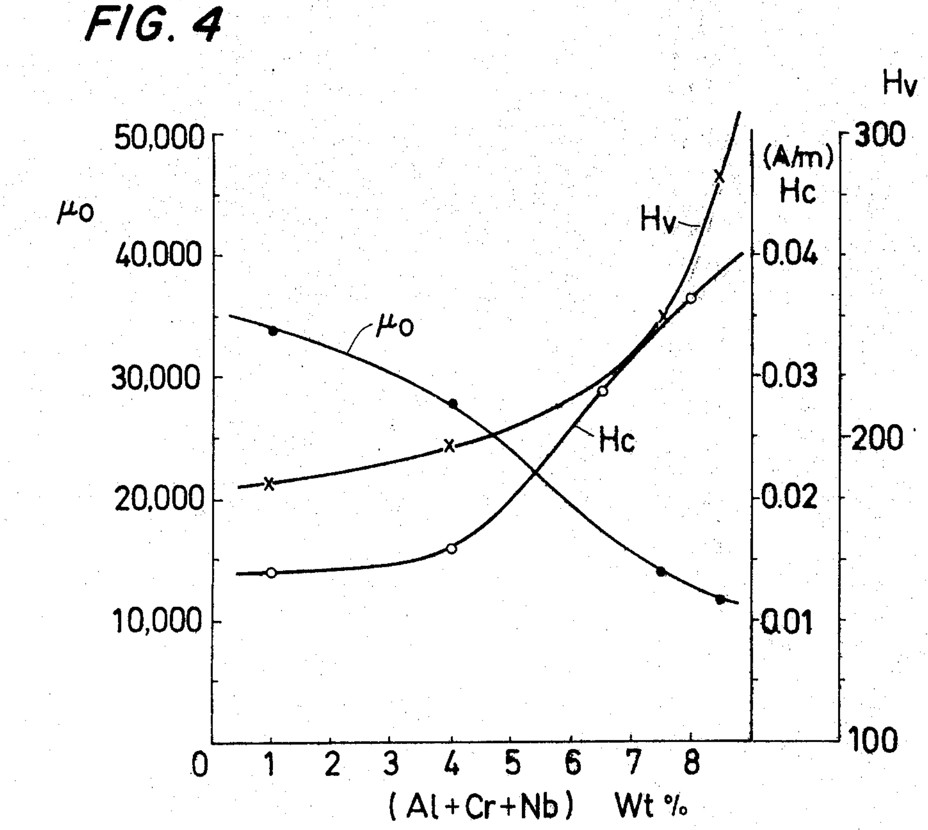
FIG. 4 represents alloys wherein the elements (a) Al and (b) Cr and Nb are incorporated into the base Ni-Fe composition and the effect on characteristics of the resulting alloy by varying amounts of (a) and (b).
Figure 5:
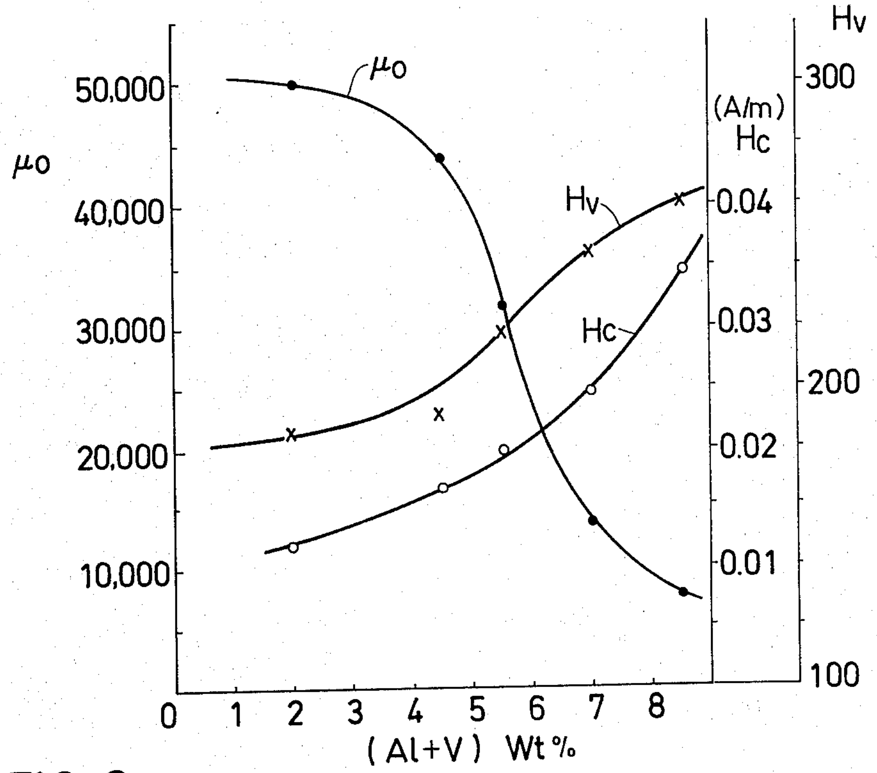
FIG. 5 represents alloys wherein the elements (a) Al and (b) V are incorporated into the base Ni-Fe composition and the effect on characteristics of the resulting alloy by varying amounts of (a) and (b).
Figure 6:
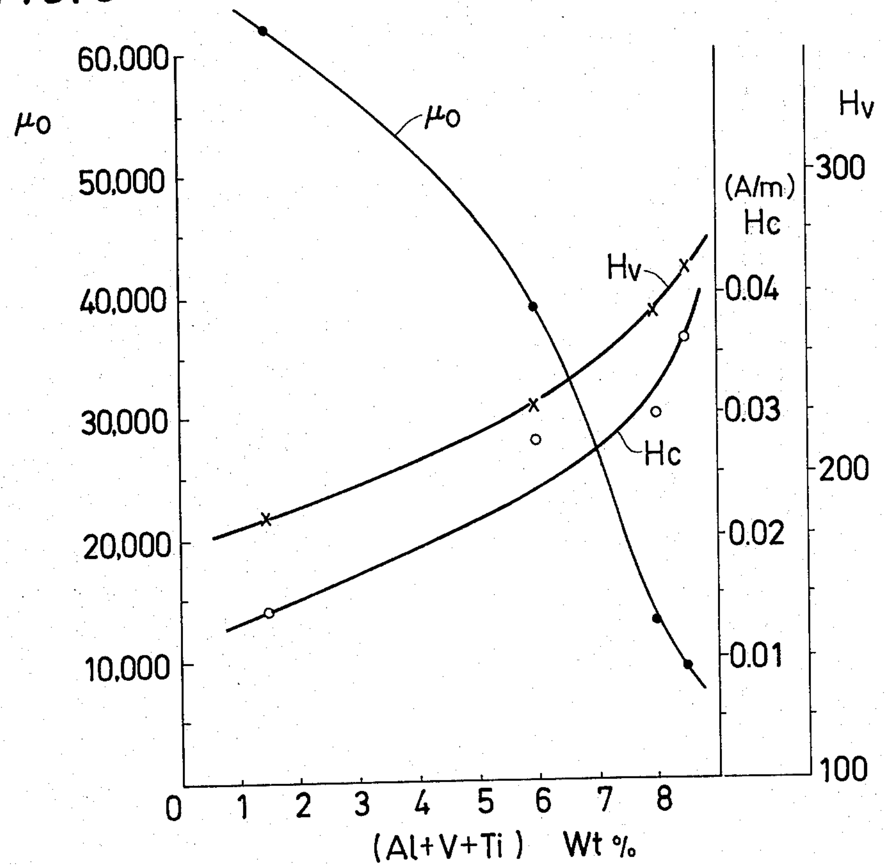
FIG. 6 represents alloys wherein the elements (a) Al and (b) V and Ti are incorporated into the base Ni-Fe composition and the effect on characteristics of the resulting alloy by varying amounts of (a) and (b).
Figure 7:
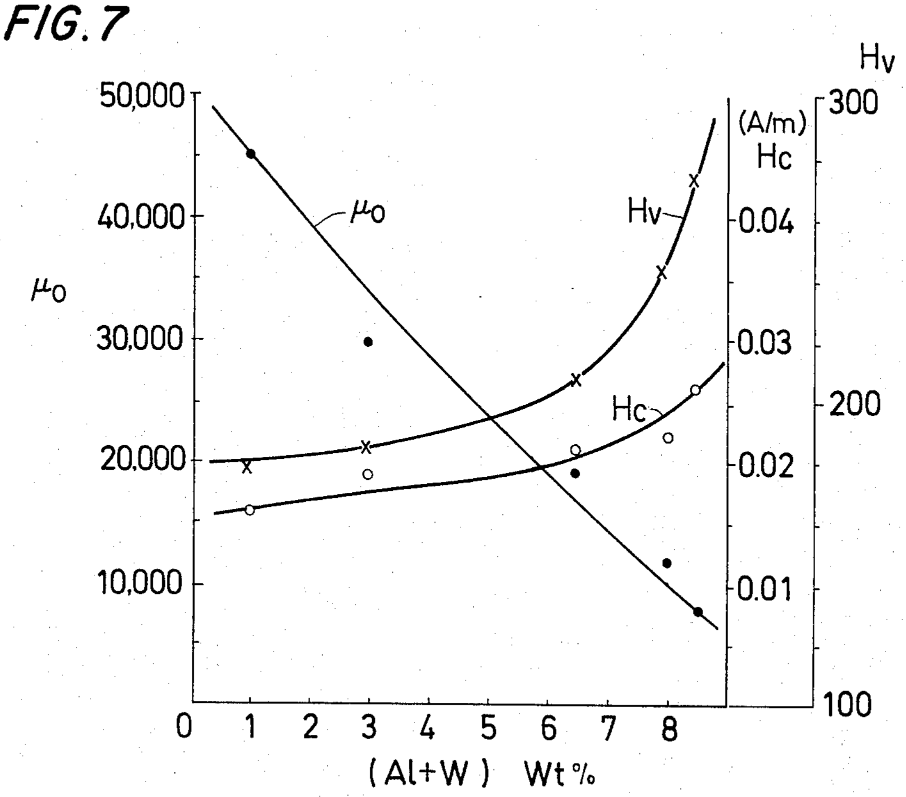
FIG. 7 represents alloys wherein the elements (a) Al and (b) W are incorporated into the base Ni-Fe composition and the effect on characteristics of the resulting alloy by varying amounts of (a) and (b).
Figure 8:
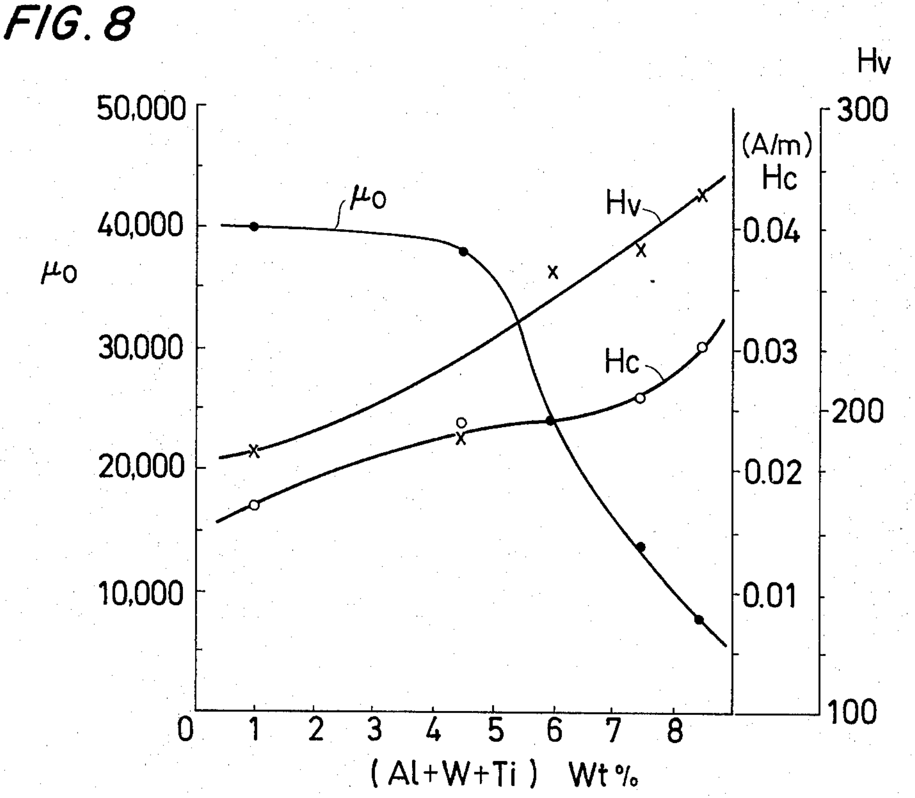
FIG. 8 represents alloys wherein the elements (a) Al and (b) W and Ti are incorporated into the base Ni-Fe composition and the effect on characteristics of the resulting alloy by varying amounts of (a) and (b).
Figure 9:
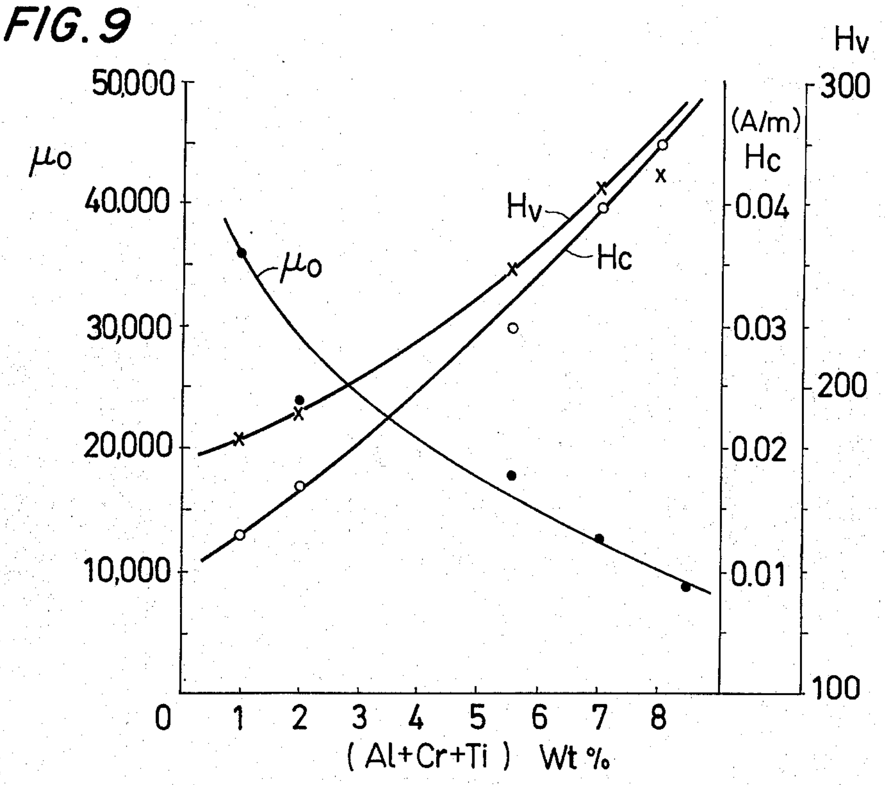
FIG. 9 represents alloys wherein the elements (a) Al and (b) Cr and Ti are incorporated into the base Ni-Fe composition and the effect on characteristics of the resulting alloy by varying amounts of (a) and (b).
Figure 10:
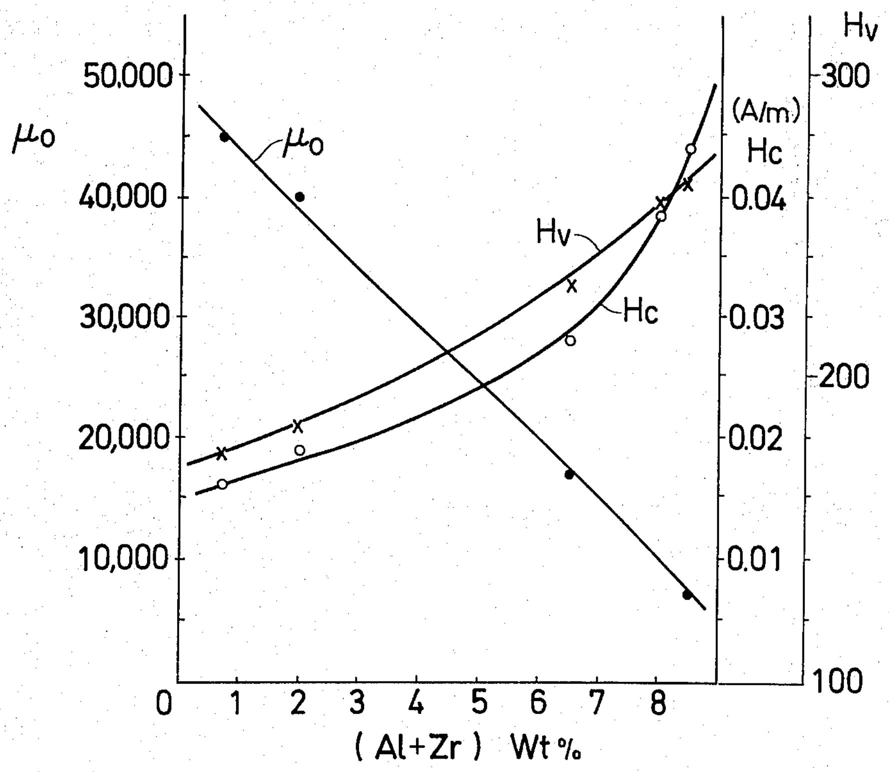
FIG. 10 represents alloys wherein the elements (a) Al and (b) Zr are incorporated into the base Ni-Fe composition and the effect on characteristics of the resulting alloy by varying amounts of (a) and (b).
Figure 11:
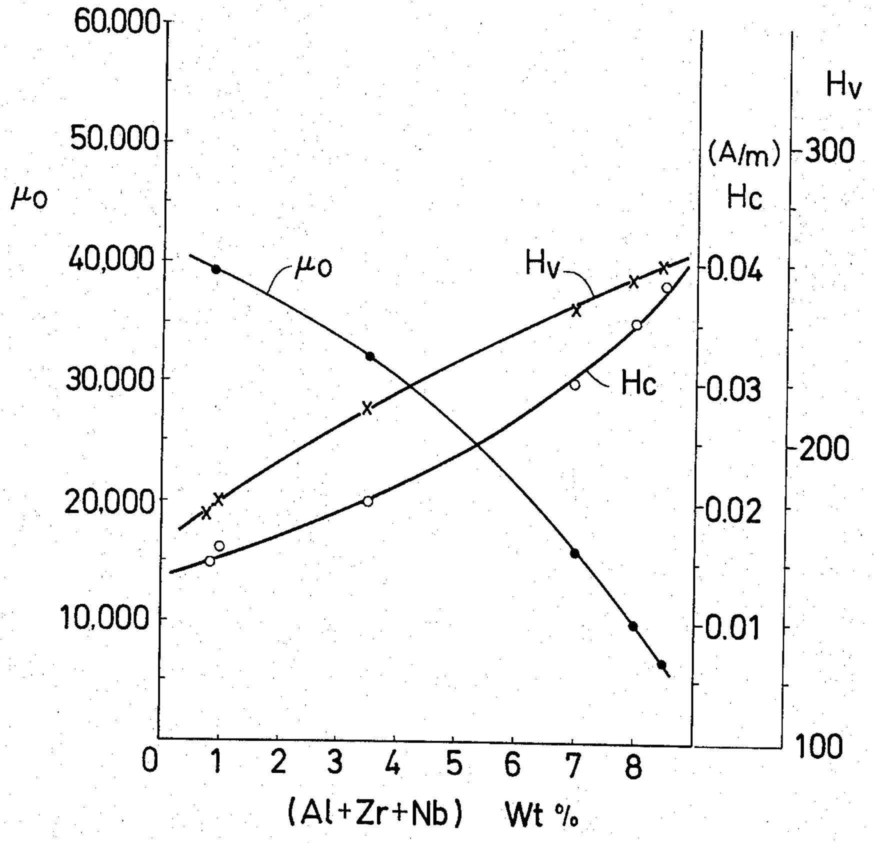
FIG. 11 represents alloys wherein the elements (a) Al and (b) Zr and Nb are incorporated into the base Ni-Fe composition and the effect on characteristics of the resulting alloy by varying amounts of (a) and (b).

As will be understood from the foregoing statement, according to the present invention, there can be obtained a material having a high magnetic permeability, which is superior in hardness, without causing a substantial drop of the value of its magnetic characteristics. By the use of this material, there can be obtained a magnetic head core having a superior resistance to wear caused by friction.

What is claimed is:

1. A high magnetic permeability heat-treated and worked alloy for magnetic head cores, consisting essentially of

| Element | % by Weight |
|---|---|
| Ni | 75–82 |
| Fe | 5–24 |
| Al | 0.5–3.0 |
| Nb | 0.2–3.0 |
| Ti | 0.3–2.0 |

wherein said alloy is characterized by an initial permeability of at least 21,000, a Vicker's hardness of at least 180, and a coercive force (Hc) of up to 1.91.

2. A high magnetic permeability heat-treated and worked alloy for magnetic core heads consisting essentially of

| Element | % by Weight |
|---|---|
| Ni | 75–82 |
| Fe | 5–24 |
| Al | 0.5–3.0 |
| V | 0.5–3.0 |
| Ti | 0.5–3.0 |

wherein said alloy is characterized by an initial permeability of at least 13,000, a Vicker's hardness of at least 188, and a coercive force (Hc) of up to 2.39 A/m.

3. A high magnetic permeability heat-treated and worked alloy for magnetic core heads consisting essentially of

| Element | % by Weight |
|---|---|
| Ni | 75–82 |
| Fe | 5–24 |
| Al | 0.5–4.0 |
| W | 0.2–3.0 |
| Ti | 0.3–2.0 |

wherein said alloy is characterized by an initial permeability of at least 14,000, a Vicker's hardness of at least 186 and a coercive force (Hc) of up to 2.07.

4. A high magnetic permeability heat-treated and worked alloy for magnetic core heads consisting essentially of

| Element | % by Weight |
|---|---|
| Ni | 75–82 |
| Fe | 5–24 |
| Al | 0.5–4.0 |
| Cr | 0.3–2.0 |
| Ti | 0.2–2.0 |

wherein said alloy is characterized by an initial permeability of at least 13,000, a Vicker's hardness of at least 184 and a coercive force (Hc) of up to 3.18.

5. A high magnetic permeability heat-treated and worked alloy for magnetic core heads consisting essentially of

| Element | % by Weight |
|---|---|
| Ni | 75–82 |
| Fe | 5–24 |
| Al | 0.5–3.5 |
| Zr | 0.2–3.5 |
| Nb | 0.3–2.0 |

wherein said alloy is characterized by an initial permeability of at least 10,000, by a Vicker's hardness of at least 180 and a coercive force (Hc) of up to 2.39 A/m.

* * * * *